Patented June 10, 1924.

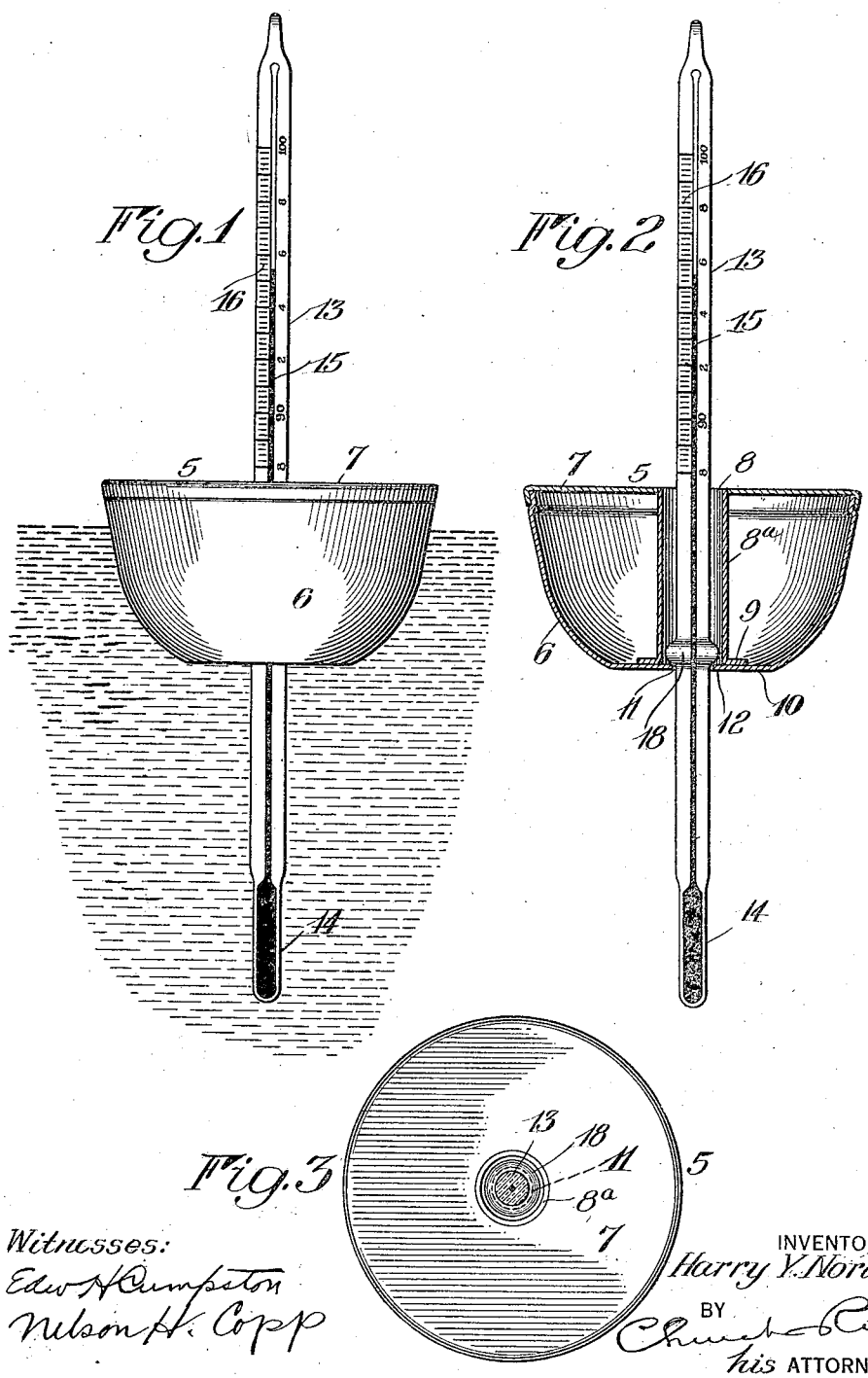

1,496,784

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

FLOATING INDICATING INSTRUMENT.

Application filed March 15, 1919. Serial No. 282,909.

*To all whom it may concern:*

Be it known that I, HARRY Y. NORWOOD, of Rochester, in the county of Monroe and State of New York, have invented certain new and useful Improvements in Floating Indicating Instruments; and I do hereby declare the following to be a full, clear, and exact description of the same, reference being had to the accompanying drawings, forming a part of this specification, and to the reference numerals marked thereon.

This invention relates to indicating devices of the variety designed for ascertaining the temperature or other characteristic of a liquid, one object of the invention being the provision of such an instrument and a buoyant support therefor adapted to float on the surface of the liquid with the instrument sufficiently submerged for purposes of accuracy and its indicating scale in a conveniently visible position. Other objects are to provide a construction such that the instrument and float are readily separable, and accessible for cleaning, and which is efficient and economical in character. To these and other ends the invention resides in certain improvements and combinations of parts all as will be hereinafter more fully described, the novel features being pointed out in the claims at the end of the specification.

In the drawings:

Figure 1 is a side elevation of the invention shown floating in a liquid;

Figure 2 is a vertical, central section of the same, and

Figure 3 is a top plan view.

Similar reference numerals throughout the several views indicate the same parts.

The present invention, in its preferred embodiment, comprises a buoyant float or body 5 formed by substantially hemispherical walls 6 closed by a cap 7. Adjacent its center, preferably, the body is provided with an opening 8 formed by a substantially cylindrical tube 8ª, the upper end of which is fitted into an opening in the cap 7, the lower end having flanges 9 attached to a flattened portion 10 of the bottom of the body, which portion has formed therein concentric with the opening 8, an aperture 11 somewhat smaller than the opening, thus providing an annular shoulder 12 forming a constricted portion at the bottom of the opening. All of the interengaging portions of the parts described are soldered or otherwise joined to prevent the entry of liquid into the body which is, therefore, buoyant and floats on the surface of the liquid.

The indicating device is embodied, in the present instance, in a preferably straight stemmed thermometer 13, provided at one end with the usual bulb 14 from which rises a column of mercury or other suitable fluid 15 indicating at its top on a scale 16. The thermometer shown in the present instance has a scale ranging from 90 to 100 degrees, being adapted for indicating the temperature of a liquid which does not vary beyond these limits, but, of course, a thermometer having any other range of scale could be used, as well as indicating instruments other than thermometers.

The thermometer is provided between its ends, adjacent its center of gravity, with an enlarged portion or shoulder 18 adapted for easy entrance into the opening 8, but too large to pass the constricted portion 12, so that the body 5 having been placed in a liquid, the thermometer may be inserted in the opening until its shoulder 18 rests upon the constricted portion 12 whereby the thermometer is supported in substantially vertical position. This arrangement by which the instrument is supported adjacent its center of gravity by engagement with a portion of the float which is well below the center of buoyancy of the latter, affords to these parts a considerable degree of stability in the position described.

The float 5 is efficient and economical in construction and so designed as to permit of the use of an instrument of substantially rectilinear form having a straight stem which is cheaper to construct than a curved stem and is also readily visible. The instrument is supported in position to bring its bulb into contact with the liquid at such a distance below its surface as to afford an accurate indication of its temperature, while the upper portion of the instrument bearing the scale is in position convenient for reading the indication. The float and instrument are readily separable, and accessible for cleaning.

I claim as my invention:

1. In a device for indicating the temperatures of liquids, the combination of a thermometer having a substantially rectilinear tube, a buoyant hollow metal body, and cooperating parts on said body and thermometer detachably supporting the latter in fixed position on said body with its bulb in the liquid and its tube in substantially upright visible position above the liquid surface.

2. In a device for indicating the temperatures of liquids, the combination of a thermometer having a substantially rectilinear tube, a buoyant body formed with a socket therein, and a shoulder portion on said thermometer tube for engagement with the sides of said socket for detachably supporting the thermometer in the socket with its bulb in the liquid and its tube in substantially upright visible position.

3. In a device for indicating the temperatures of liquids, the combination of a thermometer having a substantially rectilinear tube, a buoyant hollow metal body having an opening therethrough constricted at its lower end for the reception of said thermometer tube, and a shoulder on said tube adapted to enter the upper end of said opening and engage said constricted lower end thereof for detachably supporting the thermometer in said body opening with its bulb in the liquid and its tube in substantially upright visible position.

4. In a device for indicating the temperatures of liquids, the combination of a thermometer having a substantially rectilinear tube, a buoyant hollow sheet metal body of substantially hemispherical shape having an axial opening therethrough constricted at its lower end for the reception of said thermometer tube, and a shoulder on said tube adapted to enter the upper end of said body opening and rest on said constricted portion of the latter for detachably supporting said thermometer in fixed position on said body with its bulb in the liquid and its tube in substantially upright visible position.

HARRY Y. NORWOOD.